United States Patent [19]
Oh et al.

[11] Patent Number: 5,857,362
[45] Date of Patent: Jan. 12, 1999

[54] CENTRIFUGAL WASHING MACHINE

[75] Inventors: Dong Yeop Oh, Kyungki-do; Kyung Seop Hong, Inchon-si; Oh Hun Kwon; Kyeong Hwan Kim, both of Seoul, all of Rep. of Korea

[73] Assignee: L.G. Electronics Inc., Seoul, Rep. of Korea

[21] Appl. No.: 946,698

[22] Filed: Oct. 8, 1997

[30] Foreign Application Priority Data

Oct. 9, 1996 [KR] Rep. of Korea ................... 1996 44760

[51] Int. Cl.⁶ ............................. D06F 21/08; D06F 39/08
[52] U.S. Cl. ................................. 68/27; 68/148; 68/184; 68/207
[58] Field of Search ............................. 68/23.5, 27, 148, 68/184, 207

[56] References Cited

U.S. PATENT DOCUMENTS

| | | | |
|---|---|---|---|
| 1,234,498 | 7/1917 | Seymour, Jr. | 68/148 X |
| 1,496,644 | 6/1924 | Karasinski | 68/148 |
| 1,747,293 | 2/1930 | Geldhof | 68/148 |
| 2,449,634 | 9/1948 | Baade | 68/207 X |
| 2,584,833 | 2/1952 | Beucler | 68/148 X |
| 2,595,609 | 5/1952 | Scheele | 68/23.5 X |
| 3,413,827 | 12/1968 | Kochanek | 68/184 X |
| 4,356,711 | 11/1982 | Okazaki | 68/148 X |
| 4,771,615 | 9/1988 | Fukuzawa et al. | 68/148 X |
| 5,154,071 | 10/1992 | Singh et al. | 68/207 X |
| 5,457,970 | 10/1995 | Gutkin | 68/148 X |

*Primary Examiner*—Philip R. Coe
*Attorney, Agent, or Firm*—Fish & Richardson P.C.

[57] ABSTRACT

Centrifigal washing machine is disclosed, in which a small sized detergent solution spray pump can be used for reducing power, water and detergent consumptions, including an outer tub supported in a body of the washing machine, an inner tub rotatably held in the outer tub, a spray device rotatably held at a center of the inner tub and having a detergent solution spray hole with a narrow width and a long length and an end bent to one side, a detergent solution supply tube connected between an under side of the outer tub and one end of the spray device for guiding a detergent solution filled in the outer tub to the spray device, a pump fitted in the detergent solution supply tube for pumping the detergent solution, a first valve and a second valve fitted at an inlet and an outlet of the detergent solution supply tube respectively for opening and closing the detergent solution supply tube selectively, and a foam eliminating means for eliminating foam produced as the detergent solution is circulated when the pump is operated.

12 Claims, 5 Drawing Sheets

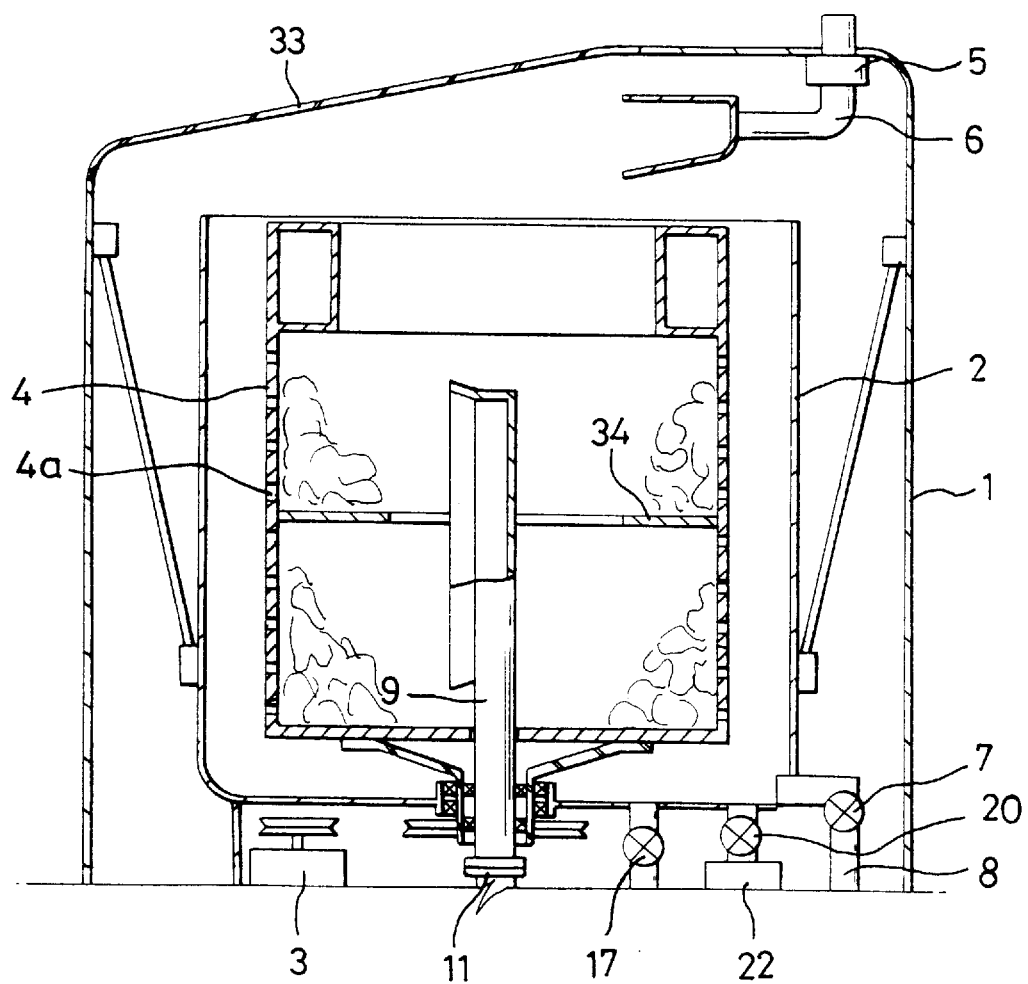

CENTRIFUGAL WASHING MACHINE

BACKGROUND OF THE INVENTION

1. Field of the Invention

The present invention is related to a washing machine, and more particularly, to a centrifugal washing machine in which a detergent solution is passed through a laundry for washing the laundry.

2. Discussion of the Related Art

A washing machine strips contaminants from between fibers in general by applying energy such as impact and the like to the laundry. Depending on the type of energy applied to the laundry, there are pulsator washing machines, drum washing machines, agitator washing machines, and the like. That is, washing is done either by giving impacts to the laundry by means of the pulsator or a washing rod, or by the impact given to the laundry when the laundry tumbled, in addition to an action of the detergent added thereto. However, conventional washing machines have problems in that the laundry can be damaged from the impact or tangled during the rotation. Accordingly, in order to solve the aforementioned problems, research on washing laundries without rubbing or giving impacts to the laundries is underway, with fruitful results in which washing machines employing a low frequency wave, washing machines employing centrifugal force and the like are developed to a stage of commercial production.

The washing machine employing centrifugal force carries out washing by passing a detergent solution through fibers of the laundry under the following principle.

In principle, the action of washing is a stripping of contaminants from the laundry in the course of the detergent passing through the laundry. It is known from an experiment that the washing can be done when a flow speed of the detergent solution passing through the fibers of the laundry relative to the laundry is more than 1 m/s. Thus, when the detergent solution is passed through a laundry higher than a certain speed, the washing can be done even if the laundry is neither rubbed nor squeezed, namely, the principle employed in the centrifugal washing machine. One example of the centrifugal washing machine is disclosed in Korean Patent Laid Open No. 94-9417. This prior art centrifugal washing machine has problems in that it has great power, water and detergent consumptions because it requires both a high flow rate of detergent solution for spraying the detergent solution through detergent solution spraying holes formed all over a spray device provided on a central portion of a washing tub and a large sized pump for exerting a great spraying power required for the washing. And, this prior art centrifugal washing machine has problems in that it has a complicated construction because a difference of rotational speeds required for the washing tub and the spray device requires an additional device which can convert a rotational speed of a motor into two rotational speeds that are different from each other and transmit the rotational speeds to the washing tub and the spray device, respectively.

SUMMARY OF THE INVENTION

Accordingly, the present invention is directed to a centrifugal washing machine that substantially obviates one or more of the problems due to limitations and disadvantages of the related art.

An object of the present invention is to provide a centrifugal washing machine in which a small sized detergent solution spray pump can be used for reducing power, water and detergent consumptions.

Another object of the present invention is to provide a centrifugal washing machine which has a simple construction.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the centrifugal washing machine includes an outer tub supported in a body of the washing machine, an inner tub rotatably held in the outer tub, a spray device rotatably held at a center of the inner tub and having a detergent solution spray hole with a narrow width and a long length and an end bent to one side, a detergent solution supply tube connected between an under side of the outer tub and one end of the spray device for guiding a detergent solution filled in the outer tub to the spray device, a pump fitted in the detergent solution supply tube for pumping the detergent solution, a first valve and a second valve fitted at an inlet and an outlet of the detergent solution supply tube respectively for opening and closing the detergent solution supply tube selectively, and a foam eliminating means for eliminating foam produced as the detergent solution is circulated when the pump is operated.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 3 illustrates a cross section of a centrifugal washing machine in accordance with a second embodiment of the present invention;

DETAILED DESCRIPTION OF THE PREFERRED EMBODIMENT

Reference will now be made in detail to the preferred embodiments of the present invention, examples of which are illustrated in the accompanying drawings.

First Embodiment

Figure 1:
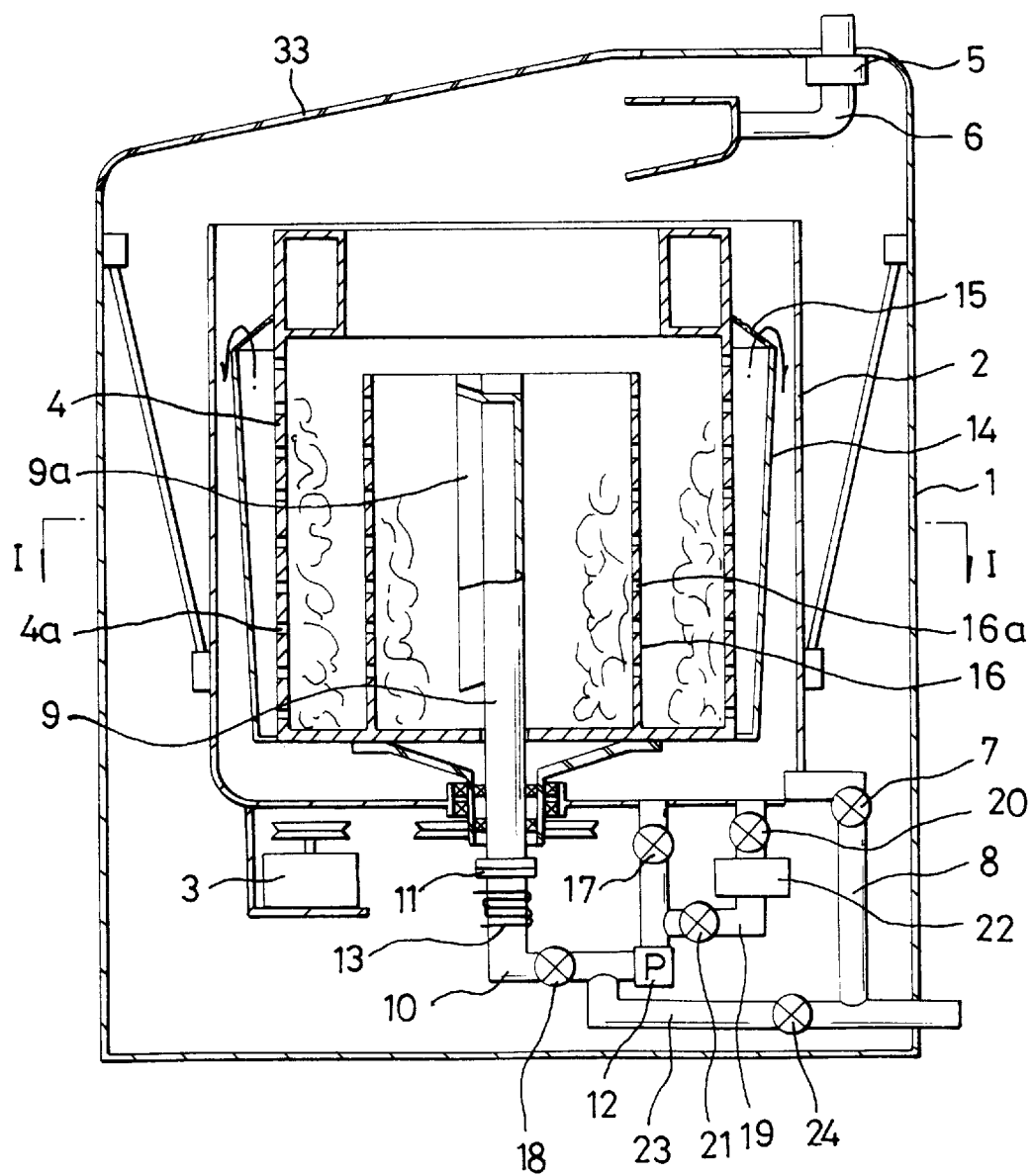
FIG. 1 illustrates a cross section of a centrifugal washing machine in accordance with a first embodiment of the present invention.
Figure 2:
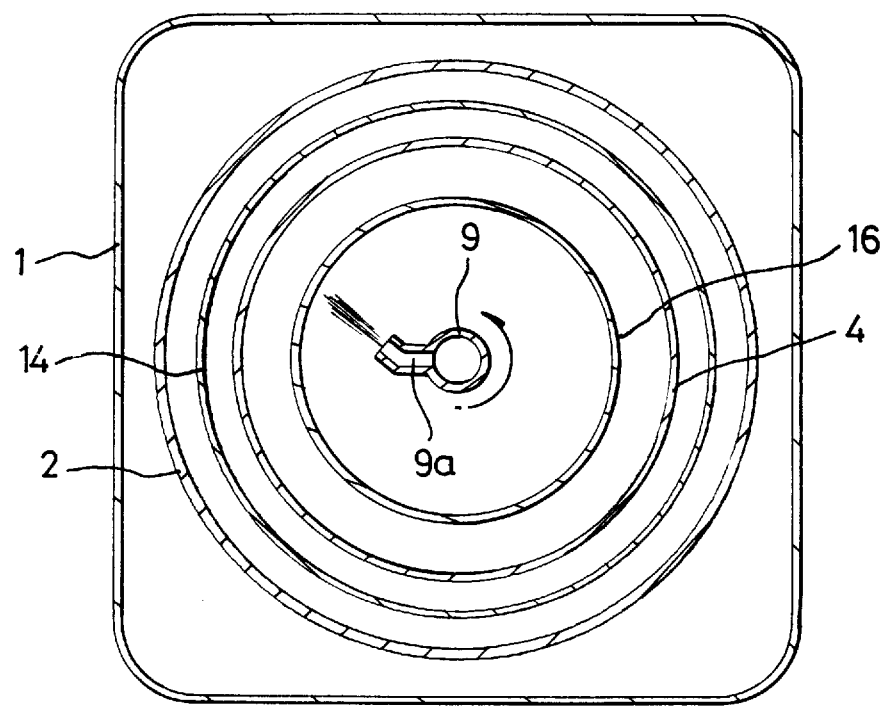
FIG. 2 illustrates a section across line I—I in FIG. 1.

FIG. 1 illustrates a cross section of a centrifugal washing machine in accordance with a first embodiment of the present invention, and FIG. 2 illustrates a section across line I—I in FIG. 1.

Referring to FIGS. 1 and 2, the centrifugal washing machine in accordance with a first embodiment of the present invention includes an outer tub 2 supported in a body on top of which a door 33 is provided and an inner tub 4 having a perforation of holes 4a rotatably disposed inside of the outer tub 2. And, there is a spray device 9 having a detergent solution spraying hole 9a rotatably disposed on a central portion of the inner tub 4. On the other hand, there is a motor 3 for rotating the inner tub 4 and the spray device 9 and different pipe line for flow of detergent solution which is a detergent dissolved in water. There is an inner partition wall 16 disposed vertically in the inner tub 4 having a perforation of holes 16a for introducing laundries after dividing an amount of the laundry for the inner tub and inside of the partition wall 16. And, there is a foam catching means, i.e., an outer partition wall 14 provided outside of the inner tub 4. The outer partition wall 14 is formed to have a greater diameter as it moves upward, with a foam catching net 15 provided at an opened top thereof. The spray device 9 has an upper portion with a detergent solution spraying hole 9a and a lower end connected to a detergent solution supply tube 10 by means of rotatable joint 11. The detergent solution spraying hole 9a with a narrow width and a long length has an end bent to one side as shown in FIG. 2 with diverged top and bottom in upward and downward directions, respectively, for even spray of the detergent solution in the upward and downward directions, respectively. The different pipe lines for flow of water and detergent solution have the following system. There are a water supply tube 6 fitted with a water supply valve 5 on top of the body of the washing machine and a drain tube 8 fitted with a drain valve 7 on an underside of the outer tub 2 for discharging the detergent solution from the washing machine. There is the detergent solution supply tube 10 connected between the spray device 9 and an underside of the outer tub 2 for supplying the detergent solution. There is a pump 12 in the middle of the detergent solution supplying tube 10 with a first valve 17 and a second valve 18 disposed at an inlet/outlet of the detergent solution supply tube 10 for selectively opening and shutting of the detergent solution supply tube 10. There is a heater 13 provided at one end of the detergent solution supply tube 10, i.e., at the outlet thereof for heating the detergent solution. And, there is a dry cleaning liquid supply tube 19 with a dry cleaning storage tank 22 connected between the inlet to the pump 12 and the outer tub 2, with a third valve 20 and fourth valve 21 fitted at the inlet/outlet of the dry cleaning liquid supply tube 19. There is a supplementary drain tube 23 with a fifth valve 24 between the outlet of the pump 12 (that is, between the pump 12 and the second valve 18) and the drain tube 8. Opening and shutting of the valves are controlled by a controller (not shown) in the washing machine.

The operation and advantages of the aforementioned washing machine of the present invention will be explained.

Upon selection of a washing button after opening the door 33 and introducing the laundry and detergent into the inner tub 4, washing, rinsing and spin drying are automatically conducted in response to control signals from the controller (not shown).

First, a washing cycle in case of water cleaning will be explained.

Upon selection of wash initiating mode together with a water cleaning button, the water supply valve in the water supply tube 6 is opened to supply water into the inner tub 4 until the inner tub 4 is filled with water to a certain level when the detergent is dissolved in the water into the detergent solution. Upon completion of supplying the water, the motor 3 rotates the inner tub 4 so that the laundry in the inner tub 4 and the inner partition wall 16 is pressed against the walls of the inner tub 4 and the inner partition wall 16 and a portion of the detergent solution flows to the outer tub 2 through the perforations of holes 16a and 4a in the partition wall 16 and the inner tub 4. Under this condition, the pump 12 in the detergent solution supply tube 10 is driven and the first valve 17 and the second valve 18 are opened, to supply the detergent solution to the spray device 9 to spray the detergent solution to the laundry through the detergent solution spray hole 9a in the spray device 9, thereby performing the washing. Namely, the sprayed detergent solution strips off contaminants inserted between fibers of the laundry while passing through the fibers. On the other hand, the spray device 9, held to slide on the inner tub 4, rotates automatically by a reaction of the spray of the detergent solution from the detergent solution spray hole 9a in the spray device 9 while the inner tub 9 is rotated by the motor 3, resulting in the rotation speeds of the spray device 9 and the inner tub 4 differing so that the spraying of the detergent solution is not concentrated on a spot, but evenly distributed all over the laundry. The small section of the detergent solution spray hole 9a of the present invention can make a spray speed high, and the spray speed is made still higher by the centrifugal force coming from rotation of the spray device 9, that improves a washing effect, because the spray speed of the detergent solution is a tangential vector sum of the spray speed from the detergent solution spray hole 9a and the rotation speed of the spray device 9. As there is one detergent solution spray hole 9a in the present invention instead of the plurality of detergent solution spray holes in the prior art, an intended spray speed can be obtained by a low capacity pump. And, as the detergent solution spray hole 9a is formed diverged in the upward and downward directions, to diverge the spray in the upward and downward directions, the laundry at an upper portion and a lower portion in the inner tub 4 can be cleaned evenly. If a large amount of laundry is washed, it is possible that the detergent solution sprayed from the detergent solution spray hole 9a will be unable to pass through the laundry at an intended relative speed, or will be unable to pass through the laundry at all, in which case the laundry may be introduced into the two spaces formed by the inner tub 4 and the inner partition wall 16, dividing the laundry by a certain amount for obtaining the intended spray speed. The intended spray speed is attained the rotated inner tub 9 and the inner partition wall 16 lead the sprayed detergent solution to the inner partition wall 16 where the detergent solution is again sprayed through the perforation of holes 16a in the inner partition wall 16 by the centrifugal force at the moment it reaches to the inner partition wall 16. In the meantime, the detergent solution that has passed through the laundry runs out toward the outer partition 14 through the perforation of holes 4a in the inner tub 4, during which foam is formed. Though the detergent solution in the outer partition wall 14 overflows into the outer tub 2 by flowing over the outer partition wall 14 by the centrifugal force, most of the foam stays in a space between the inner tub 4 and the outer partition wall 14. The small amount of foam flowing toward the outer tub 2 together with the detergent solution is caught by the foam catching net 15, thereby the foam can not flow toward the outer tub 2, but stays between the inner tub 4 and the outer partition wall 14, eliminating the foam. Since heating the detergent solution supplied to the spray device 9 with the heater 13 at the outlet of the detergent solution supply tube 10 provides an effect of boiling the laundry, the effect of washing can be further improved.

A draining operation, discharging contaminated detergent solution to outside of the washing machine after the washing cycle, will be explained.

Upon completion of the washing cycle, the drain valve 7 is opened, draining the detergent solution out of the washing machine through the draining tube 8. In this instance, since the first valve 17 at the inlet to the detergent supply tube 10 is opened, the second valve 18 at the outlet from the detergent supply tube 10 is closed, and the pump 12 is put into operation, discharging the detergent solution out of the washing machine through the supplementary drain tube 23, the draining can be done quickly.

Upon completion of the draining operation, identical to the aforementioned washing cycle, the rinsing cycle is carried out, and upon completion of the washing cycle and the rinsing cycle, the spin dry cycle is started. In the spin dry cycle, the inner tub 4 is rotated at a high speed, extracting water contained in the laundry as the laundry is pushed onto a wall of the inner tub 4, thereby carrying out the spin drying. In this case, as the drain valve 7 is only opened when the pump 12 is stopped, the water is drained through the drain tube 8.

The case of dry cleaning without water will be explained.

After introducing laundry into the inner tub 4 and filling a dry cleaning liquid in the dry cleaning liquid storage tank 22, a wash initiating mode and a dry cleaning washing button are selected. Then, the second, third and fourth valves 18, 20 and 21 are opened and the pump 12 is put into operation, to spray the dry cleaning liquid stored in the dry cleaning liquid storage tank 22 through the detergent solution spray hole 9a in the spray device 9, thereby carrying out the washing. In this instance, water is not supplied as the water supply valve 5 is shut. Since other operations are identical to the water cleaning case, explanations of the operations will be omitted.

Second Embodiment

The second embodiment, being a modification from the first embodiment, is designed to wash laundries with different washing conditions separately.

Figure 4A:
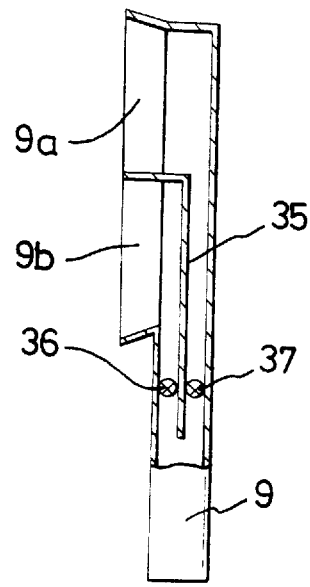
FIG. 4A illustrates a longitudinal section of a spray device applied to the second embodiment of the present invention.
Figure 4B:
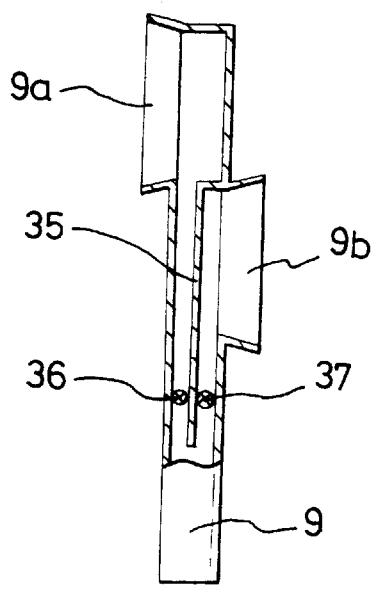
FIG. 4B illustrates a longitudinal section of another embodiment spray device applied to the second embodiment of the present invention; and, FIG. 5 illustrates a cross section of a centrifugal washing machine in accordance with a third embodiment of the present invention.

FIG. 3 illustrates a cross section of a centrifugal washing machine in accordance with a second embodiment of the present invention, FIG. 4A illustrates a longitudinal section of a spray device 9 applied to the second embodiment of the present invention, and FIG. 4B illustrates a longitudinal section of another embodiment of spray device 9 applied to the second embodiment of the present invention, referring to which the second embodiment will be explained.

There is a divisional plate 34 detachably disposed horizontally in the inner tub 4, allowing to divide the inner tub 4 into two spaces (an upper space and a lower space). The spray device 9 is provided with a separation plate 35 for forming two detergent solution passages and two detergent solution spray holes 9a and 9b for spraying the detergent solution into the upper space and the lower space, separately. A first supplementary valve 36 and a second supplementary valve 37 are provided in the passages respectively to be controlled by the controller (not shown) for selective opening and shutting of the passages.

The operation and advantages of the second embodiment of the present invention will be explained.

In case it is desired that two sort of laundries, for example, a highly dirt laundry and a general laundry are washed separately, the laundries may be washed after introducing the laundries into the two spaces in the inner tub 4 divided by the divisional plate 34, separately. In this instance, the detergent solution is individually sprayed into respective spaces by means of the separation plate 35 provided in the spray device 9. If the laundry only exists in the lower space of the inner tub 4, only the first supplementary valve 36 is opened to spray the detergent solution only into the lower space, in which case a spraying power of the detergent solution becomes greater, which improves a washing effect. In this embodiment, the detergent solution spray holes 9a and 9b in the spray device 9 may be formed in the same direction as shown in FIG. 4A, or in directions opposite to each other as shown in FIG. 4B.

Third Embodiment

The third embodiment of the present invention has a foam catching means different from that of the first embodiment, but with the same basic washing principle as the first embodiment.

Figure 5:
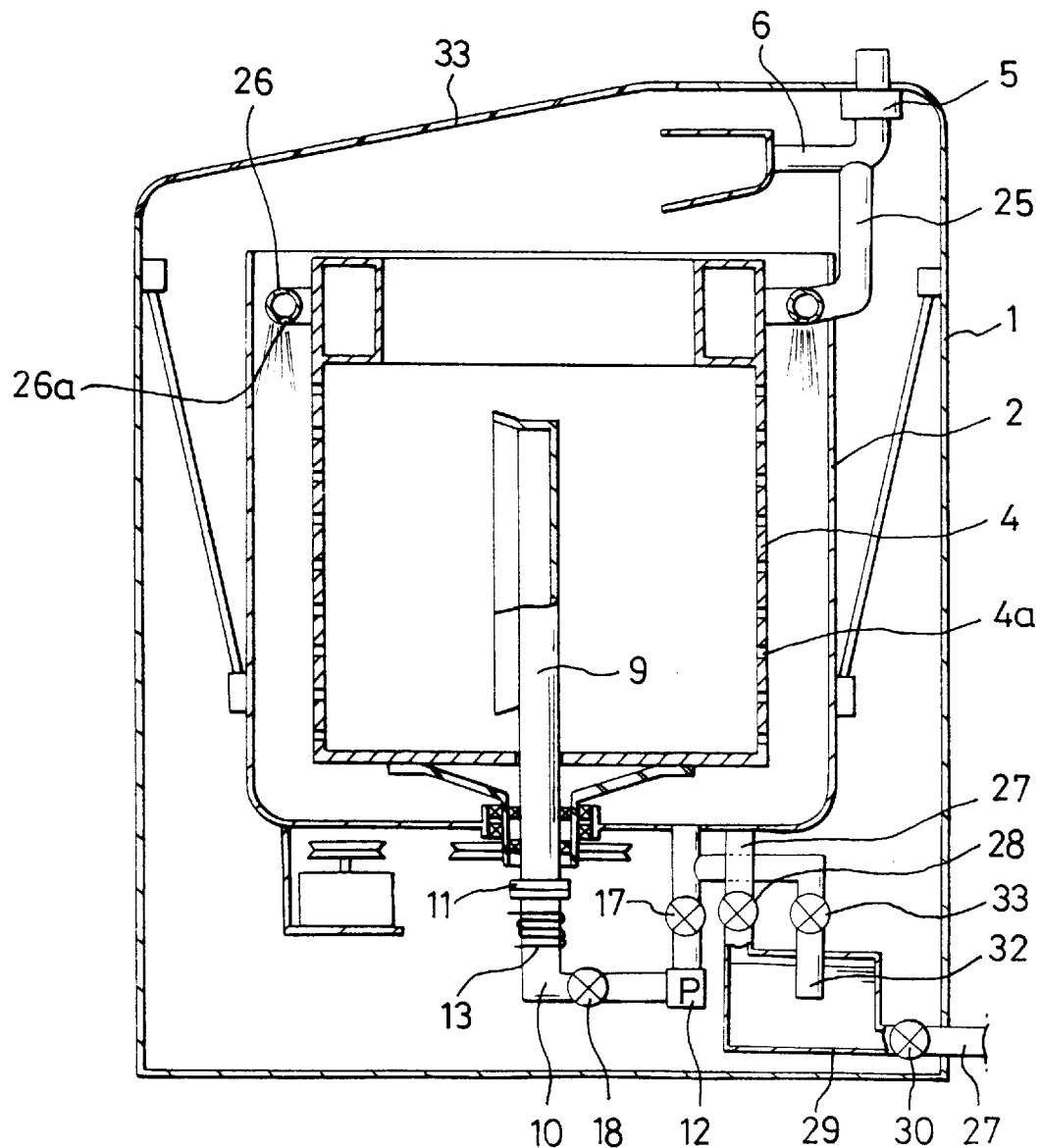

FIG. 5 illustrates a cross section of a centrifugal washing machine in accordance with a third embodiment of the present invention, referring to which the third embodiment of the present invention will be explained.

There is a water supply tube 6 to which a supplementary water supply tube 25 is connected. An outlet side of the supplementary water supply tube 25 has a form of a ring to form a ring tube 26 which is provided in the inner tub 4. The ring tube 26 has a plurality of holes 26a for spraying water into the outer tub 2. There is a detergent solution storage tank 29 in a middle of a drain tube 27, with a sixth valve 28 and a seventh valve 30 at an inlet/outlet of the detergent solution storage tank 29. There is a supplementary detergent solution supply tube 32 with a eighth valve 33 therein connected between the detergent solution storage tank 29 and the detergent solution supply tube 10. That is, the detergent solution having the foam eliminated therefrom stored in the detergent solution storage tank 29 can be used again by supplying it through the spray device 9. Though not explained, like the first embodiment of the present invention, elements required for carrying out the dry cleaning can be added to this third embodiment.

The operation and advantages of the third embodiment of the present invention will be explained.

As the sixth valve 28 is opened in the washing cycle, a portion of the detergent solution is stored in the detergent solution storage tank 29, and the foam produced as the detergent solution passes through the laundry is collected in the outer tub 2. In the washing cycle, there is a certain duration of pause, during which the foam in the outer tub 2 is eliminated. In detail, in the elimination of the foam, the sixth valve 28 is closed and the water supply valve 5 is opened, supplying external clean water through the water supply tube 6, a portion of which is guided to the supplementary water supply tube 25 and sprayed downwardly at a certain pressure through the holes 26a formed in the ring tube 26, that breaks the foam collected in the outer tub 2, eliminating the foam. Thereafter, when a washing cycle is started again, as the eighth valve 33 is opened and the pump 12 is put into operation, the detergent solution in the outer tub 2 and the detergent solution in the detergent solution storage tank 29 are supplied to the spray device 9 so that the detergent solution supplied to the spray device 9 is sprayed onto the laundry at a certain speed through the detergent solution spray hole 9a, thereby the washing is carried out.

It will be apparent to those skilled in the art that various modifications and variations can be made in the centrifugal washing machine of the present invention without departing from the spirit or scope of the invention. Thus, it is intended that the present invention cover the modifications and variations of this invention provided they come within the scope of the appended claims and their equivalents.

What is claimed is:

1. A centrifugal washing machine, comprising:

an outer tub supported in a body of the washing machine;

an inner tub rotatably held in the outer tub;

a spray device rotatably held at a center of the inner tub and having a detergent solution spray hole with a narrow width and a long length and an end bent to one side;

a detergent solution supply tube connected between an under side of the outer tub and one end of the spray device for guiding a detergent solution filled in the outer tub to the spray device;

a pump fitted in the detergent solution supply tube for pumping the detergent solution;

a first valve and a second valve fitted at an inlet and an outlet of the detergent solution supply tube respectively for opening and closing the detergent solution supply tube, selectively; and, a foam eliminating means for eliminating foam produced as the detergent solution is circulated when the pump is operated.

2. A centrifugal washing machine as claimed in claim 1, wherein the detergent solution spray hole is formed such that an upper portion thereof is upwardly sloped as the upper portion goes outwardly and a lower portion thereof is downwardly sloped as the lower portion goes outwardly.

3. A centrifugal washing machine as claimed in claim 1, further comprising a heater fitted at the outlet of the detergent solution supply tube for heating the detergent solution flowing through the detergent solution supply tube.

4. A centrifugal washing machine as claimed in claim 1, further comprising an inner partition wall disposed vertically in the inner tub and having a perforation of holes.

5. A centrifugal washing machine as claimed in claim 1, further comprising:

a dry cleaning liquid supply tube fitted between the detergent solution supply tube and the under side of the outer tub;

a dry cleaning liquid storage tank fitted in the dry cleaning liquid supply tube; and, a third valve and a fourth valve fitted at an inlet and an outlet of the dry cleaning liquid supply tube, respectively, for selectively opening and closing the dry cleaning liquid supply tube.

6. A centrifugal washing machine as claimed in claim 1, further comprising a supplementary drain tube connected between the detergent solution supply tube and the drain tube of the washing machine.

7. A centrifugal washing machine as claimed in claim 1, further comprising:

a divisional plate disposed horizontally in the inner tub for dividing the inner tub into two spaces;

a separation plate provided in the spray device for separating the detergent solution spray hole into two passage; and, a first supplementary valve and a second supplementary valve for selective opening and closing of the passages formed by the separation plate.

8. A centrifugal washing machine as claimed in claim 7, wherein the detergent solution spray holes are formed in a same direction.

9. A centrifugal washing machine as claimed in claim 7, wherein the detergent solution spray holes are formed in directions opposite to each other.

10. A centrifugal washing machine as claimed in claim 1, wherein the foam eliminating means includes, a cylindrical outer partition wall formed outside of the inner tub and having an increasing diameter as the cylindrical outer partition wall goes upward, and a foam catching net fitted at a top of the cylindrical outer partition wall.

11. A centrifugal washing machine as claimed in claim 1, wherein the foam eliminating means includes a supplementary water supply tube disposed at an upper portion of the inner tub and having one end connected to the water supply tube which supplies washing water into the inner tub and the other end having a ring tube of a ring form with a plurality of holes.

12. A centrifugal washing machine as claimed in claim 1, further comprising:

a detergent solution storage tank fitted in the drain tube of the washing machine; and, a supplementary detergent solution supply tube connected between the detergent solution storage tank and the detergent solution supply tube.

* * * * *